Feb. 13, 1945.  E. M. ZUBATSKY  2,369,384.
COMBINATION SHIPPING CRATE AND TRAILER
Filed June 8, 1942   2 Sheets-Sheet 1
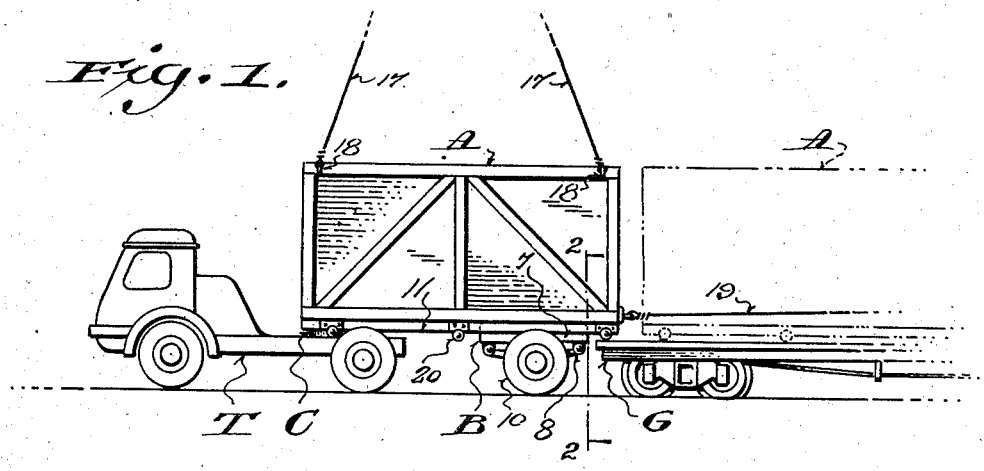
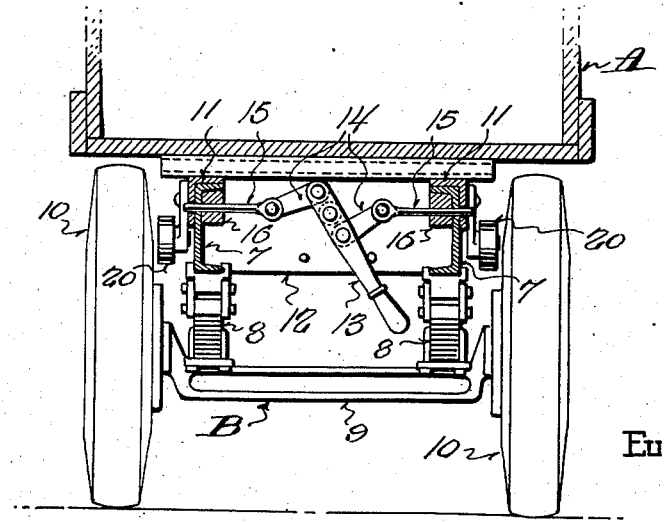
Inventor:
Eugene M. Zubatsky Feb. 13, 1945.  E. M. ZUBATSKY  2,369,384
COMBINATION SHIPPING CRATE AND TRAILER
Filed June 8, 1942  2 Sheets-Sheet 2
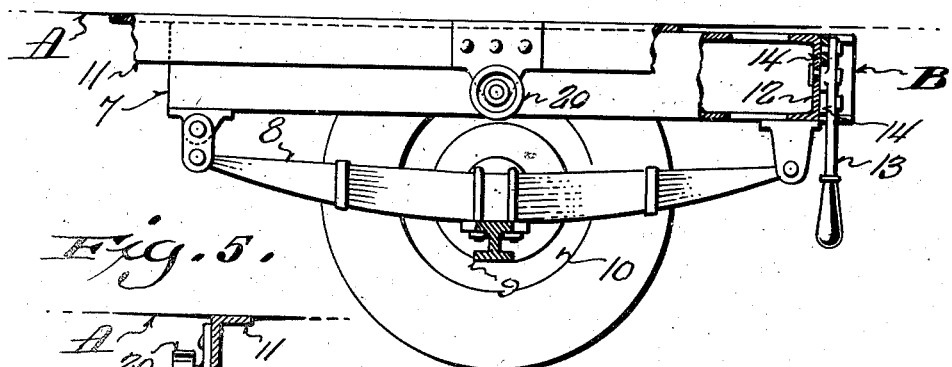
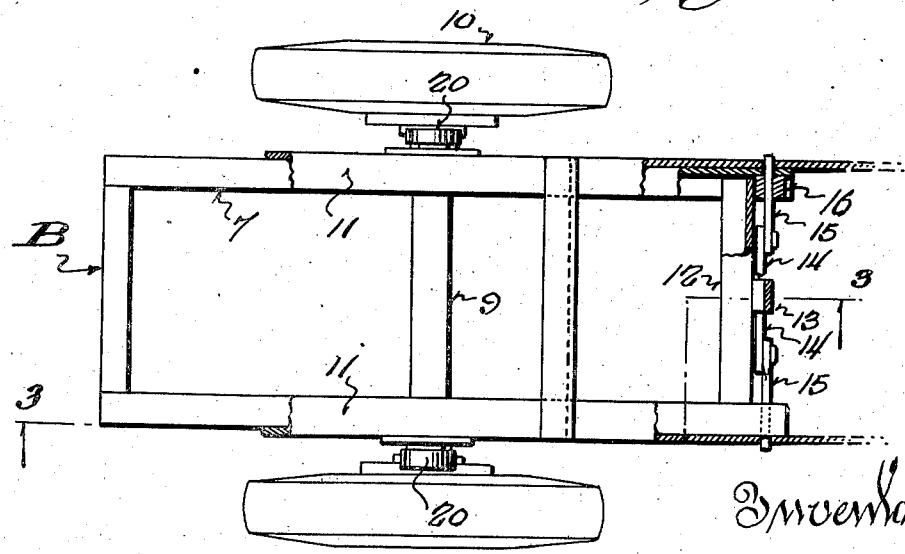
Inventor
Eugene M. Zubatsky
Attorney Patented Feb. 13, 1945

2,369,384

UNITED STATES PATENT OFFICE 2,369,384

COMBINATION SHIPPING CRATE AND TRAILER

Eugene M. Zubatsky, Milwaukee, Wis.

Application June 8, 1942, Serial No. 446,254

1 Claim. (Cl. 280—30)

This invention pertains to a combination shipping crate and trailer, in which the crate is provided with detachable supporting wheels for converting it into a trailer for transportation by means of a truck or other type of automotive vehicle, whereby the crate can be loaded or packed at the source of supply, and conveniently transported as a trailer to a carrier, such as a flat car or vessel for further shipment, at which point the supporting wheels are removed to reduce the bulk of the crate and for subsequent use on other crates.

Obviously the present invention eliminates repeated handling of goods and resultant damage, and inasmuch as the trailer unit is capable of serving a substantial number of crates, the cost of equipment and its maintenance is reduced to a minimum.

With the above and other objects in view, which will appear as the description proceeds, the invention resides in the novel construction, combination, and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 is an elevational view illustrating one form and application of the present invention;

Figure 2 is a transverse sectional view taken substantially on the line 2—2 of Figure 1;

Figure 3 is a longitudinal sectional view of the trailer supporting unit illustrated in Figure 1, the same being taken on the line 3—3 of Figure 4;

Figure 4 is a plan view of the trailer supporting unit with parts broken away and in section; and Figure 5 is a fragmentary sectional view illustrating the top of a flat car provided with tracks for guiding rollers carried by the crate.

Referring now more particularly to the accompanying drawings, that form of the invention disclosed in Figs. 1, 2, 3 and 4 consists of a shipping crate designated by the letter A and provided with a detachable wheel or trailer supporting unit B adjacent its rear end. The forward end of the crate A is supported on a fifth wheel C mounted on the frame of a truck or automotive vehicle T.

As best shown in Figs. 2 to 4 inclusive, the supporting wheel unit B includes a rectangular channel frame 7 supported by springs 8 upon an axle 9 which carries rubber tired wheels 10.

Secured to the bottom of the crate A is a pair of longitudinal angle iron runners 11 supported upon and straddling the longitudinal channels of the wheel unit frame 7.

Mounted upon a rear transverse channel 12 of the frame 7, is a lever 13 connected by links 14 to a pair of oppositely disposed locking plungers 15, which are slidably journaled in blocks 16 carried by the side channels of the frame 7.

After the crate has been deposited upon the frame 7, to securely clamp and lock the same thereon, it is merely necessary to swing the lever 13 and project the plungers through openings provided in the longitudinal runners or angle irons 11 carried by the crate.

It will be noted further that a plurality of rollers 20 are fastened to the runners 11 to facilitate portability of the crate on floors or platforms, and also the transfer of the crate to a carrier, such as the flat car G shown in Fig. 1. In addition the rollers engage the frame of the truck to assist in sliding the front end of the crate upon the truck frame to assemble and lock the 5th wheel connection, as shown in Fig. 1.

In some instances the rollers or casters may be entirely eliminated and the crate merely skidded on and off the carrier on its runners 11.

As indicated in Fig. 1 the crate A may be removed from the truck T and the supporting unit B by hoist cables 17 connected to eyes 18, or by a windlass cable 19 for sliding or skidding the crate onto the floor of a flat car or box car. On the other hand if winches are not available, the truck may be employed after releasing the supporting unit B for backing and sliding the crate longitudinally onto the floor of the car a sufficient distance to support the crate and permit further manual rolling or sliding of the crate entirely onto the car.

In the drawings a conventional crate is shown, which may be of any desired construction having either end doors, or an open or removable top, inasmuch as the crate structure is not a feature of the invention.

From the foregoing explanation considered in connection with the accompanying drawings it will be appreciated that an exceedingly simple and inexpensive apparatus has been provided for transportation of a shipping crate in the form of a trailer or semi-trailer, which can then be transferred to a carrier without the bulk of the trailer wheels, in view of which it is merely necessary to pack the crate at its source of supply and unpack it at its point of destination, whereas heretofore in shipping goods in large bulk it has been customary to pack and load the goods into a truck or hauling vehicle for transportation to the carrier, where the goods must be handled again. At the source of destination the same amount of work is involved in the removal of the goods from the carrier and delivery to its destination.

My invention reduces the amount of handling and labor in the shipment of goods to a minimum, and as I have explained a single trailer or supporting unit can be used to service any number of crates thus eliminating considerable expense of individual equipment for each crate and reducing the bulk of the shipment to a minimum.

I claim:

In combination with a shipping crate provided with longitudinal runners, a detachable wheel unit including a frame for supporting said runners, a pair of manually operable plungers carried by said frame for projection into said runners to lock the same on said frame, a traction vehicle, and means for detachably connecting one end of said crate on the traction vehicle to permit the crate to be transported on said wheel unit as a semi-trailer.

EUGENE M. ZUBATSKY.